United States Patent
Westbroek et al.

[11] Patent Number: 6,060,682
[45] Date of Patent: May 9, 2000

[54] OVERLAPPING JOINT FOR LASER WELDING OF TAILORED BLANKS

[76] Inventors: Wido Westbroek, 1-525 Oakvale Drive, Waterloo, Ontario, Canada, N2T 2G8; Gursharan Ubhi, 17 Anita Drive, St. Clements, Ontario, Canada, N0B 2M0; David Hughes, 5 Riverside Crescent, Toronto, Ontario, Canada, M6S 1B5

[21] Appl. No.: 09/118,003

[22] Filed: Jul. 17, 1998

Related U.S. Application Data

[63] Continuation of application No. PCT/CA97/00855, Nov. 13, 1997.

[51] Int. Cl.[7] .................................................... B23K 26/00
[52] U.S. Cl. .................... 219/121.64; 219/105; 228/153
[58] Field of Search ................... 219/121.63, 121.64, 219/105, 107; 228/153, 154, 170, 171, 174

[56] References Cited

U.S. PATENT DOCUMENTS

| | | | |
|---|---|---|---|
| 4,661,677 | 4/1987 | La Rocca | 219/121.64 |
| 4,873,415 | 10/1989 | Johnson et al. | 219/121.64 |
| 4,912,299 | 3/1990 | Oros et al. | 219/74 |
| 4,960,973 | 10/1990 | Fouche et al. | 219/121.64 |
| 5,035,179 | 7/1991 | Bender et al. | 102/202 |
| 5,183,989 | 2/1993 | Sanders et al. | 219/105 |
| 5,343,010 | 8/1994 | Urech | 219/83 |
| 5,591,359 | 1/1997 | Saitou et al. | 219/121.64 |
| 5,601,735 | 2/1997 | Kawamoto et al. | 219/121.63 |

FOREIGN PATENT DOCUMENTS

| | | |
|---|---|---|
| 208564 | 5/1986 | European Pat. Off. . |
| 460449 | 4/1994 | European Pat. Off. . |
| 028884 | 6/1995 | European Pat. Off. . |
| 2408680 | 9/1975 | Germany . |
| 4104256 | 8/1992 | Germany . |
| 4210547 | 6/1993 | Germany . |
| 4307563 | 9/1993 | Germany . |
| 59-092189 | 5/1984 | Japan . |
| 62-98087 | 5/1987 | Japan .................... 228/153 |
| 1-202385 | 8/1989 | Japan ................ 219/121.64 |
| 1-306086 | 12/1989 | Japan ................ 219/121.64 |
| 3-230883 | 10/1991 | Japan ................ 219/121.64 |
| 804298 | 2/1981 | U.S.S.R. ................... 228/171 |

*Primary Examiner*—Geoffrey S. Evans
*Attorney, Agent, or Firm*—John R. S. Orange; Kevin Pillay; Santosh K. Chari

[57] ABSTRACT

A joint is formed between adjacent edges of a pair of weldable components by forming an undercut on one of the edges. The other edge abuts the undercut so that a portion of the one edge overlaps the other. The edges are laser welded by impinging a beam on the portion to melt the overlap.

18 Claims, 6 Drawing Sheets

OVERLAPPING JOINT FOR LASER WELDING OF TAILORED BLANKS

This application is a continuation of international application PCT/CA97/00855 filed Nov. 13, 1997, designating U.S.A.

This invention relates to a method of metals, and in particular to laser-welding of tailored blanks from a plurality of components.

In forming metal components for automotive applications, a number of components—typically but not necessarily of different thickness and composition—are butted together and welded into a single "tailored" blank prior to subsequent forming. In one application, flat metal sheets of different characteristics are welded to one another to provide a composite blank for subsequent stamping. Similarly, tubular members of different wall thicknesses may be welded to one another to provide a tailored tubular blank for subsequent forming.

In order to ensure that the welded joint is free of pinholes or gaps, the individual blanks must be precision sheared to produce a smooth 90° shear surface. The sheared surfaces of the metals or weld components have to be maintained parallel to each other by being clamped onto a suitable support while the welding head, typically a laser beam, moves relative to the seam to achieve joining of the components.

Edge quality requirements for laser tailor blanking are highly stringent. There are specifications to characterize the edges to be welded for both the straightness and shear to break ratios. The absolute values of these parameters are dependent upon laser beam characteristics such as energy distribution, pointing stability, available laser power and welding speed. Using a 6 kW laser with a beam mode of TEM 00 or a similar mode and 0.4 mm diameter spot size on the work piece, the edge straightness requirement would be less than ±004" for a 60" long weld line. For the same beam characteristics, the requirement for the shear to break ratio would be 75% or greater.

These requirements are very hard to meet with current technologies and know-how. To achieve weldable edges, industry uses double-edged shears or techniques adapted from fine blanking technologies. Both approaches are very expensive and the double-shearing method adds another step in the process.

Furthermore, in some situations where the edges of the sheets diverge, a butt weld produces as a sunken surface at the weld seam, which requires a filler material to be used during welding. This is undesirable as it causes the introduction of an additional metal into the weld joint as well as complicating the welding apparatus.

Several techniques have been employed in the prior art to overcome these difficulties, which include oscillating the laser beam transverse to the seam or overlapping of components to form a lap weld. A disadvantage of the first technique is that the additional optics required to oscillate the laser beam are relatively expensive and furthermore results in a reduced welding speed. The second technique has a disadvantage in that it yields blanks that have a stepped profile or height change in the vicinity of the weld, thus producing blanks that are thicker than either of the original metal sheets and do not at least have one flat surface extending across the joint.

It is an object of the invention to provide a laser welding system for producing an improved joint between weld components.

In accordance with this invention there is provided a method for producing a welded joint between two metal weld components comprising the steps of forming an undercut on an edge of at least one of the components, placing an edge of the other of the components adjacent the undercut so that a portion of the one edge overlaps the other in a direction transverse to the edges; applying a laser beam to the portion to cause melting of said adjacent edges of said weld components and subsequently cooling the edges to join the edges t one another.

In one embodiment, the undercut is formed as a rabbet along said edge, either by coining or milling, and in another embodiment the undercut is formed as a chamfer extending over at least a portion of a surface defining said one edge.

Preferably, where said components are planar sheets they are supported on a pair of planar support surfaces that are aligned with one another to provide an aligned planar surface after welding. Alternatively, said surfaces may be offset from one another to provide a stepped surface.

By providing an undercut, an overlap between the components is provided that compensates for small discrepancies in the fit between the edges of the two components and ensures that the whole welding beam impinges upon a component rather than passing through a gap between the components. The overlapping portion of the component also provides a reservoir of molten material to fill gaps between the edges as the weld progresses and avoids the need for a filler material.

Embodiments of the invention will now be described by way of example only with reference to the accompanying drawings in which.

Figure 1:
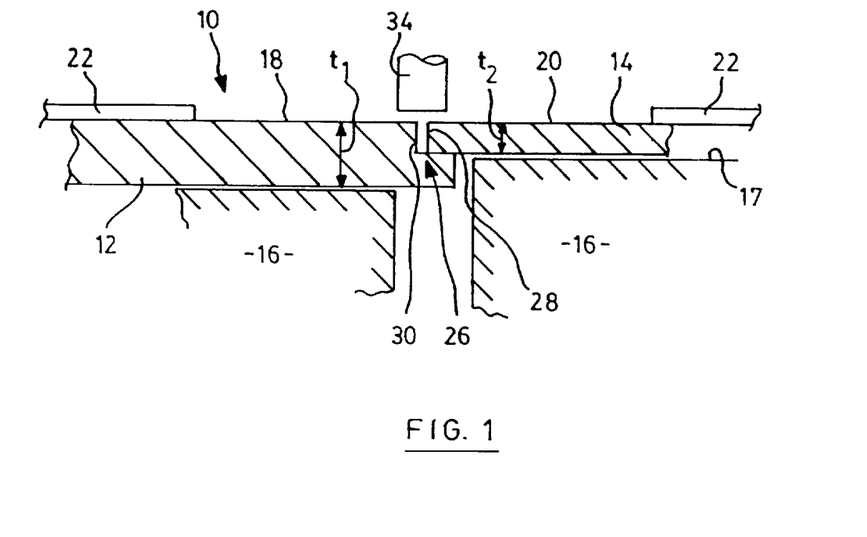
FIG. 1 shows a cross-section of a joint showing the weld components prior to welding.

Referring to FIG. 1, a joint 10 is formed between a pair of sheet metal components 12,14 of different thickness to form a tailored blank having at least one continuous flat surface. To form the joint 10, the pair of weld components, 12 and 14, each having respective thicknesses $t_1$ and $t_2$, are arranged on a pair of supports 16 that are spaced from one another by a distance d. In the embodiment of FIG. 1, the supports 16 are arranged with their support surfaces 17 offset by the difference in thickness of the components so that the upwardly directed surfaces 18, 20 are aligned.

The components 12 and 14 are held in position on the support 16 by a pair of clamps 22 that may be of suitable form including magnetic if the components are themselves magnetic.

The joint 10 is formed between adjacent edges 24,28 respectively of components 12,14 and continues the common extent of the edges 24,28. The joint 10 may be linear or curved depending upon the desired configuration of the components 12,14.

As can be seen in FIG. 1, one edge 24 of the component 12 is formed with a rabbet 26 to define an undercut and receive an edge 28 of the other component 14. The rabbet 26 has a wall 30 having a height corresponding to the thickness $t_2$ of the other component 14 and a floor 32 that has a width greater than the anticipated deviation of the edges 24,28.

The components are positioned with the edge 28 adjacent and ideally abutting the wall 30 and with the lower surface of the component 14 supported on the floor 32. The edges 24, 28 of the components 12,14 are thus overlapped in a direction transverse to the edges but the upper surfaces 18, 20 aligned in a common plane.

A laser beam 34 is arranged above the rabbet 26 and can move relative to edges 24, 28 along the joint 10, as indicated by arrow A. The beam 34 applies a localized laser irradiation that causes heating and thereby melting of the metal in a region of the joint 10. The irradiated area of the joint 10 may be shielded with an inert gas in a conventional manner as appropriate.

Figure 2:
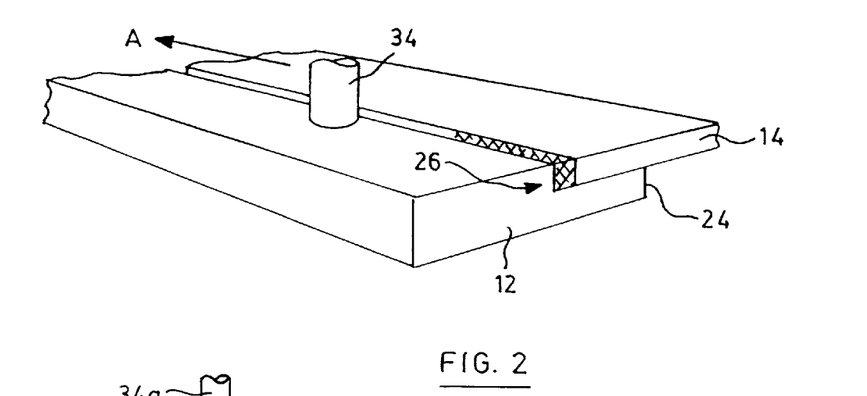
FIG. 2 is a perspective view of the joint of FIG. 1.

As the laser beam 34 is moved along joint 10, both of the weld components 12, 14 are melted locally. Continued movement of the beam allows the material to solidify and join the two components into a united blank as shown in FIG. 2. The overlapping of the edges 24, 28 ensures that the laser 34 impinges upon a component to cause the localised melting rather than passing between the edges if they diverge. Moreover, as the material is melted it fills any gaps that are present between the edges 24,28 and avoids the need for filler material.

The rabbet 26 may be produced in a variety of ways including coining after the material is sheared from a sheet or milling of the edge after shearing. The junction between the wall 30 and floor 32 need not be perpendicular and could be radiused or obtuse but a perpendicular edge is preferred.

Figure 3:
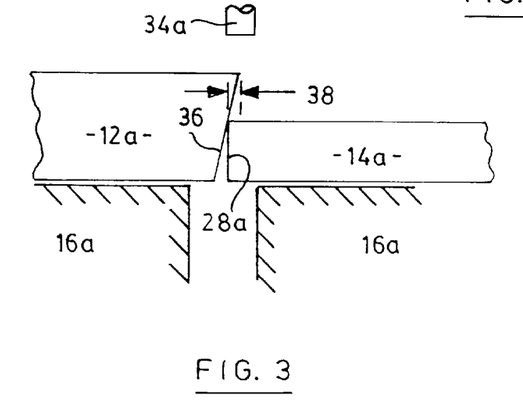
FIG. 3 is an alternative embodiment of joint showing placement of the weld components prior to welding.

An alternative embodiment of joint is shown in FIG. 3 in which like components are identified with like numerals with a suffix 'a' added for clarity. In this embodiment, the supports 16a are arranged to provide an alignment of the lower surfaces of the weld components 12a, 14a. The undercut on edge 24 is provided as a chamfer 36 having an angle of inclination in the order of 10° to the vertical, ie. 80° to the face 18a. As can be seen in FIG. 3, the edge 24a overlaps the edge 28a so that an overhang indicated at 38 is provided.

Figure 4:
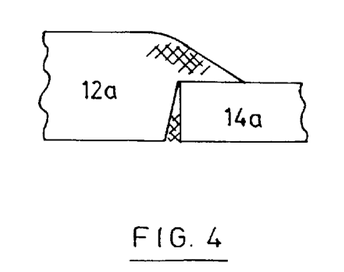
FIG. 4 is a cross-section of a welded joint formed from the components of FIG. 3 after processing.

To weld the components 12a, 14a, the laser 34a impinges the overhang 38 to melt it and the edges 24a,28a to form the welded joint. As can be seen in FIG. 4, the material in the overhang provides a fillet of material as it melts to fill the gap between the components and strengthen the joint 10a. The lower surfaces of the components 12a, 14a are maintained in alignment by the supports 16a to produce a planar finished surface.

The appropriate value for the bevel angle is chosen considering the difference in thickness between the sheets, the extent of the gap between the sheets which is produced under standard butt configuration and the laser beam characteristics.

It has been found that the following criteria may be used for determining an appropriate angle α for the chamfer 36.

If $G_{max}$ is the maximum gap encountered with a standard butt configuration, then $G_{max}$<Overhang 38<2.5 $G_{max}$ and ⅔ focal spot radii>Overhang 38>½ focal spot radii Moreover, if the sheets have thicknesses $t_1$ and $t_2$, then $$30 < \left(\frac{(t_1 - t_2)}{t_2} \times 100\right) < 70$$

After selecting an appropriate overhang, the bevel angle α is given by

α=90- $\tan^{-1}$ (Overhang 38/($t_1-t_2$))

It has been found preferable for the beam 34 to be positioned such that 50% ±10% of the beam is positioned over the thicker component 12.

In tests conducted with the arrangement of FIG. 3, the following parameters were utilized:

| | |
|---|---|
| Relative speed between laser beam and the joint: | 6.2 metres/minute |
| Laser beam power: | 6 kilowatts utilizing a $CO_2$ continuous laser |
| Laser beam mode: | $TEM_{01}$. |
| Laser beam diameter: | 0.028 inches |
| Shield gas: | Helium above, Argon below |
| Thickness of weld component 12: | $t_1$ = 0.074 inch |
| Thickness of weld component 14: | $t_2$ = 0.034 inch |
| Weld component material: | Galvaneal (hot rolled galvanized mild steel) |
| Inclination of chamfer to vertical, α: | 10° |

Figure 5:
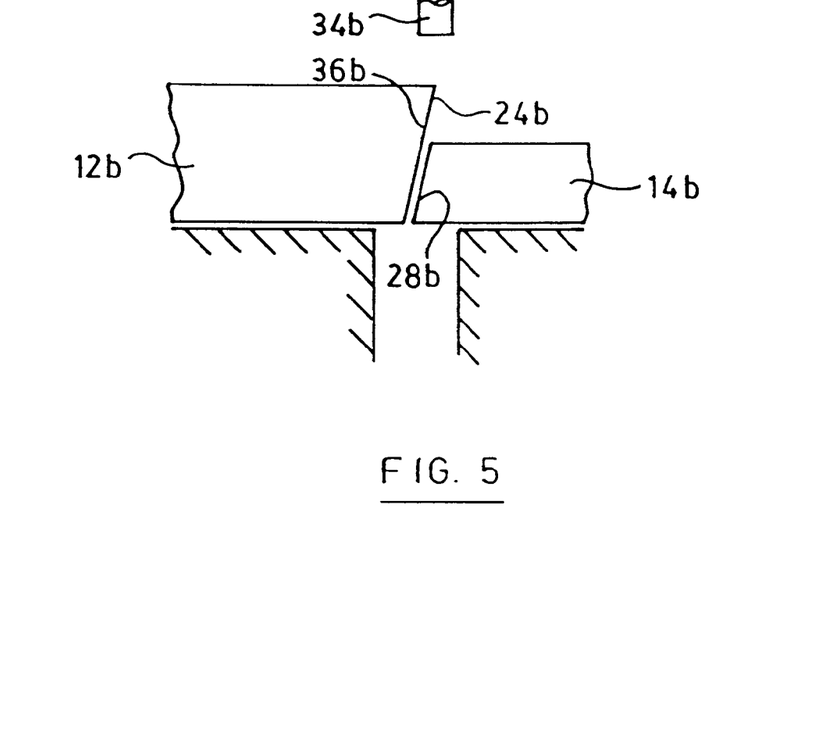
FIG. 5 is a sectional view of a further embodiment of components for forming a welded joint.

A variation on the arrangement shown in FIG. 3 is shown in FIG. 5 where like components are identified with a suffix 'b'. In this arrangement, the edge 28b is chamfered in a complementary manner to chamfer 36b so that a close alignment between the edges is obtained. The amount of fill required from overhang 38 is thus reduced and a continuous lower surface produced. If preferred, the chamfer 36 intercepts the surface defining edge 24 approximately 25% of thickness $t_1$ from the upper surface 18a and at a point above the upper surface 20a of the component 14a. The overhang 38 is then reduced accordingly.

Figure 6:
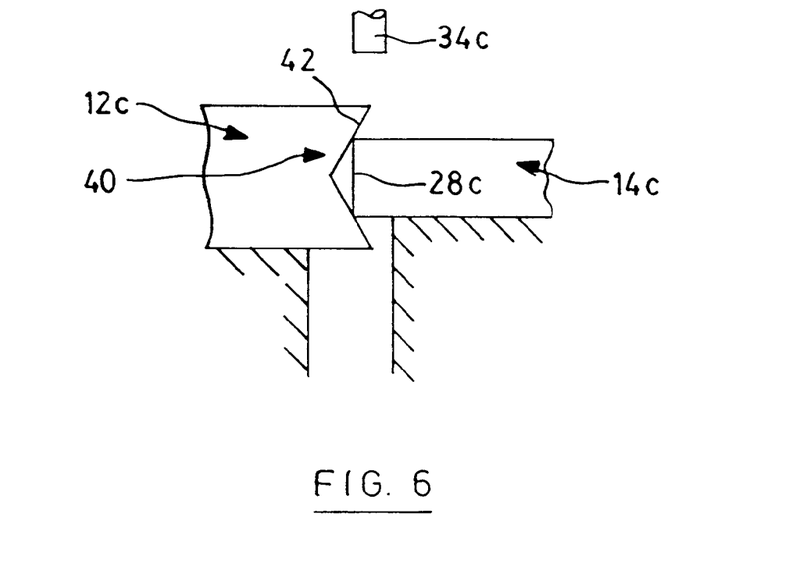
FIG. 6 is a further embodiment showing an arrangement of components for producing an offset joint.

If a stepped surface is required for particular circumstances, then the supports 16 can be arranged as shown in FIG. 6 to align the components 12c, 14c in the desired position so that after welding, the components adopt a corresponding position. The undercut is formed as a chevron 40 having opposed oppositely inclined flanks 42,44 which receive the edge 28c. An overhang 38c is provided for the edge 28c so that the laser 34c impinges on the weld material of component 12c to cover minor deviations and provide a fill material.

In each embodiment, the overlapping of the components avoids the need for close tolerance edge preparation and also provides a source of material to fill the weld joint in the molten area. This enhances the finished surface to avoid localized depressions and can provide extra material in the joint area for increased strength. By adjusting the overlap, the optimum weld characteristics can be obtained and the need for filler wire is avoided.

The overlap could also be adjusted to compensate over the length of the joint for distortion between the components as the weld progresses. Thus the overlap could vary from one end to the other in the initial alignment so that the overlap is substantially constant as the beam moves along the weld.

In each of the above embodiments, the body of the components 12,14 is illustrated as having different thicknesses. However, similar benefits may be achieved using sheets of similar thickness by providing a localized reduction of thickness at one edge. This may be beneficial when a uniform thickness of blank is required but different types of material on different physical or chemical characteristics are required in parts of the blank.

Figure 7:
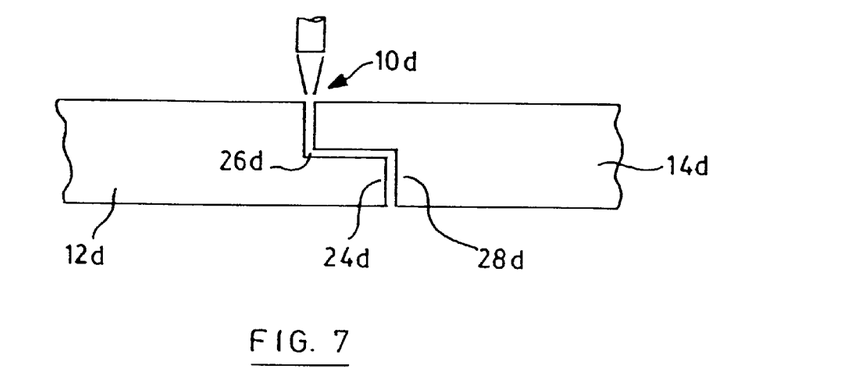
FIG. 7 is a view similar to FIG. 1 showing a joint between a pair of components of similar thickness.

Thus, for example, as shown in FIG. 7, a joint 10*d* is provided similar to FIG. 1 in which a rabbet 26*d* is formed on both edges 24*d*,28*d*. The orientation of the sheets 12*d*, 14*d* is reversed to provide an overlap on both surfaces. The joint 10*d* may be welded from one side or, if necessary or desirable, from both sides to join the components 12*d*, 14*d*. In this manner, a joint is formed between components of equal thickness without the close tolerances required for a conventional butt joint.

Figure 8:
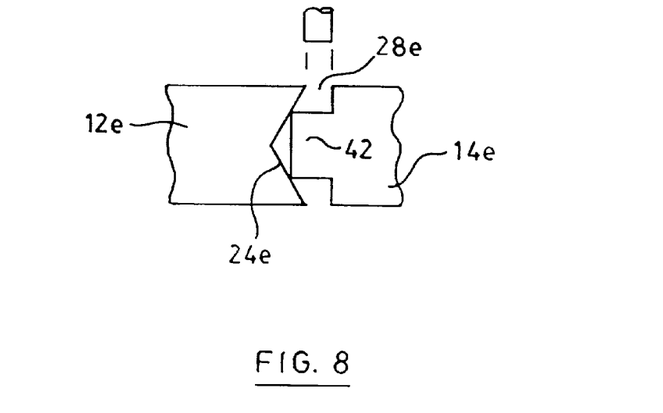
FIG. 8 is a view similar to FIG. 6 showing a further embodiment of joint between components of similar thickness.

Similarly, as shown in FIG. 8, an arrangement similar to FIG. 6 may be used with components of equal thickness by reducing the thickness of one edge 28*e* to produce a tongue 42. The tongue fits into the undercut provided by chevron 40 and permits welding from one or both sides.

Figure 9:
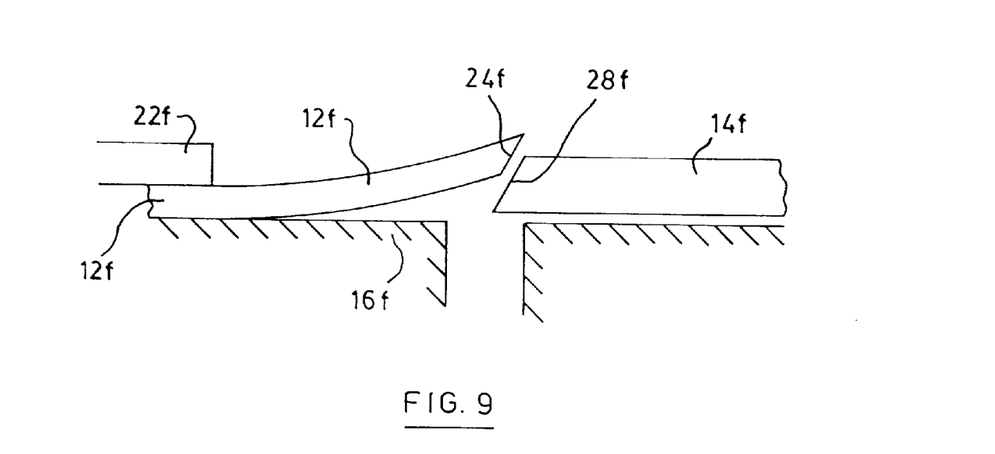
FIG. 9 is a side view of a further arrangement of joint utilizing a configuration similar to FIG. 5.

A further arrangement is shown in FIG. 9 that relies upon the resilience of one of the components to produce a finished surface. In the embodiment of FIG. 9, each edge 24*f*,28*f* of the components 12*f*, 14*f* is chamfered in a manner similar to FIG. 5 above. The components 12*f*, 14*f* are positioned relative to one another so that the edge 24*f* is elevated from the support 16*f* and therefore overlaps the edge 28*f*. the elevation is facilitated by the inherent resilience of the material of the component 12*f* and the placement of the clamp 22*f* away from the joint 10*f*.

Laser beam 34*f* impinges on the overhang 38*f* to melt it and as it melts, the resilience in the component 12*f* causes the edge 24*f* to move onto the support 10*f* and into alignment with the component 14*f*. A planar blank is thus provided.

The arrangement of FIG. 9 may be used with components of equal or differing thickness.

Although mechanical clamping has been shown, it will be appreciated that magnetic, vacuum or other equivalent techniques could be used to hold the components in alignment.

Figure 10:
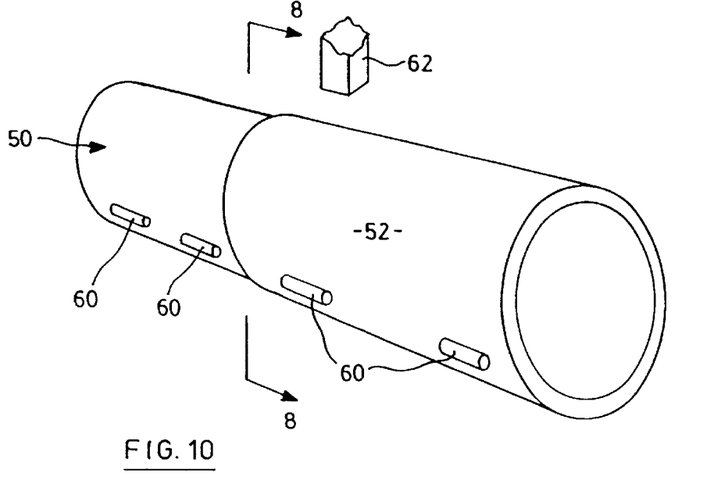
FIG. 10 is a perspective view of a further embodiment in which the weld components are tubular.
Figure 11:
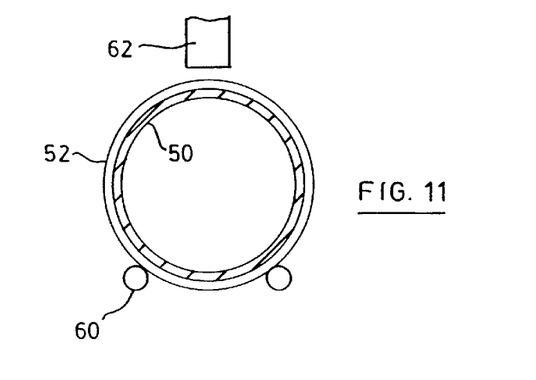
FIG. 11 is a view on the line 11—11 of FIG. 10.
Figure 12:
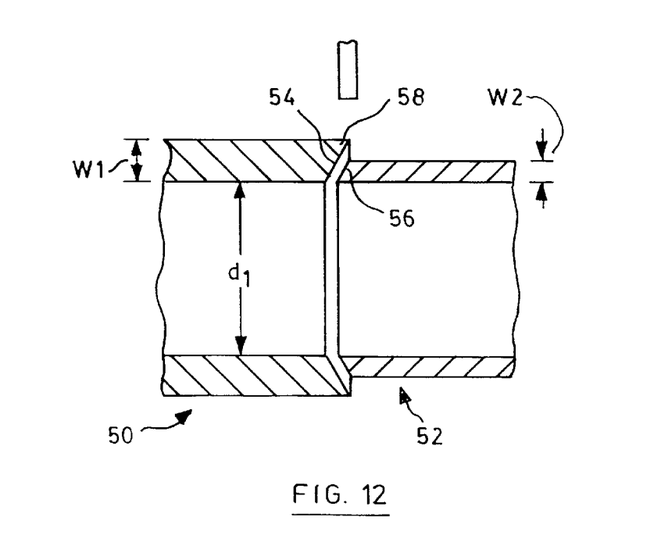
FIG. 12 is a section on the line 12—12 of FIG. 11.

The above embodiments have been described in relation to generally planar components but similar benefits can be realized in connecting a pair of tubular components 50,52. In the embodiment as shown in FIGS. 10–12, each of the members 50,52 has a common internal diameter D1 with different wall thicknesses $W_1$, $W_2$ respectively.

The tubular members 50,52 are each formed with frustoconical end surfaces 54,56 respectively, each having an included cone angle in the order of 160°. Accordingly, the surfaces 54,56 are disposed at an angle of approximately 10° to the radial plane of the members 50,52 to correspond to the general arrangement above as shown in FIG. 5 above.

The differential thickness between the walls $W_1$, $W_2$ provides an overhang indicated at 58 when the tubular members are aligned co-axially and the frustoconical surface 56 nested within the frustoconical surface 54.

The tubular members 50,52 are supported upon rollers 60 so as to be concentric and rotatable about a common axis and a suitable jig applies an axial load between the tubes to maintain the ends in abutment. A laser 62 is positioned over the overhang 58 so as to impinge upon both of the tubular members 50,52. The tubular members can then be rotated conjointly by the rollers 60 and the tubular members 50,52 welded to one another to provide a tubular tailored blank.

The provision of the blank permits tubular member with different characteristics to be obtained which is useful in a variety of applications. In particular, tubular members may be utilized in a hydroforming operation in which high-pressure fluid is used to transform a tubular member into a tubular irregularly shaped component. Such an application is useful in the automotive industry for such things as chassis and suspension members. The provision of tubular members 52,54 with different characteristics, such as wall thickness and material, facilitates the production of such a component.

Figure 13:
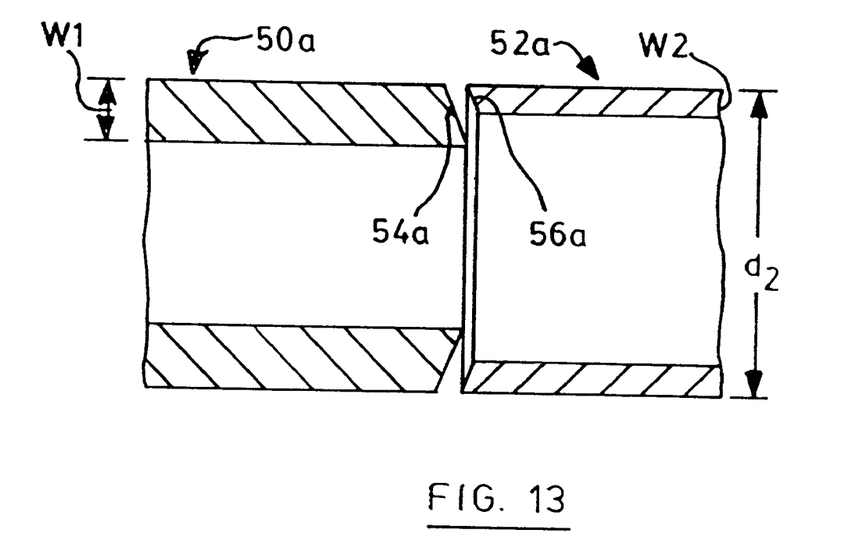
FIG. 13 is a further embodiment showing the arrangement of welding tubular components.

As shown in FIGS. 10–12, the tubular members have a common internal diameter but they may also be arranged to have a common external diameter as shown in FIG. 13. Like reference numerals will be described with like components with the suffix "a" added for clarity. In the embodiment of FIG. 13, the tubular members 50*a*,52*a* have respective frustoconical surfaces 54*a*,56*a* which nest within one another. The outer diameter indicated at D2 is common to both members and the wall thickness $W_1$,$W_2$ differ so that a stepped internal surface is provided. The junction of the two tubular members is irradiated by a laser 62*a* to weld the two members to one another and provide a tubular member with a uniform outer diameter but a stepped internal diameter.

Figure 14:
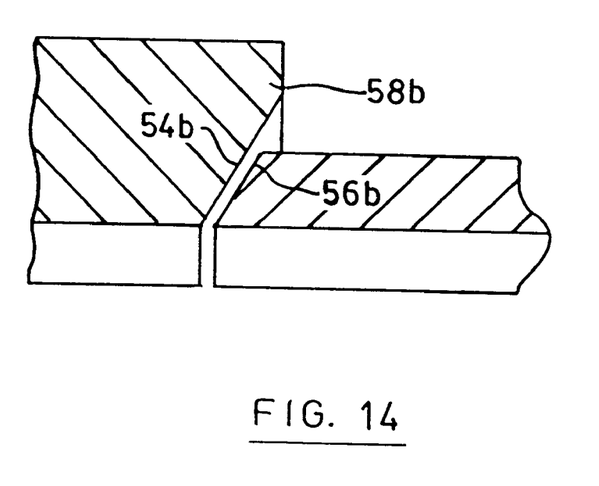
FIG. 14 is an enlarged view of a still further embodiment for forming the joint shown in FIG. 12.

The embodiments of FIGS. 12 and 13 have been illustrated with a frustoconical surface but as shown in FIG. 14, the surfaces 54 may be formed with a truncated shoulder in the overhang 58*b*. Similarly, a truncated overhang may be used with the planar components shown in FIGS. 3, 5 and 6.

Figure 15:
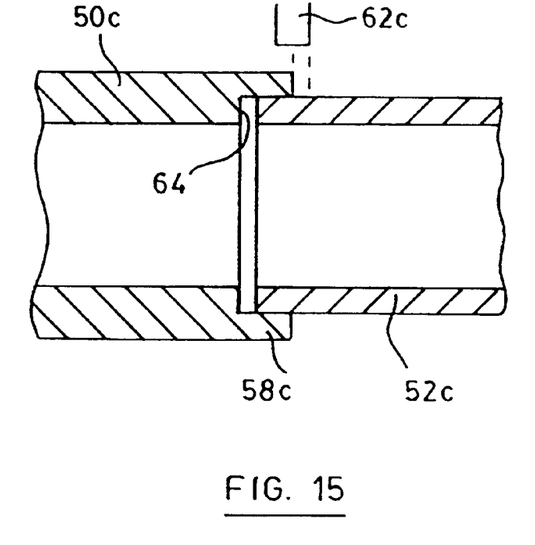
FIG. 15 is a yet further embodiment showing an alternative formation to establish the overlapping of the components shown in FIG. 8.
Figure 16:
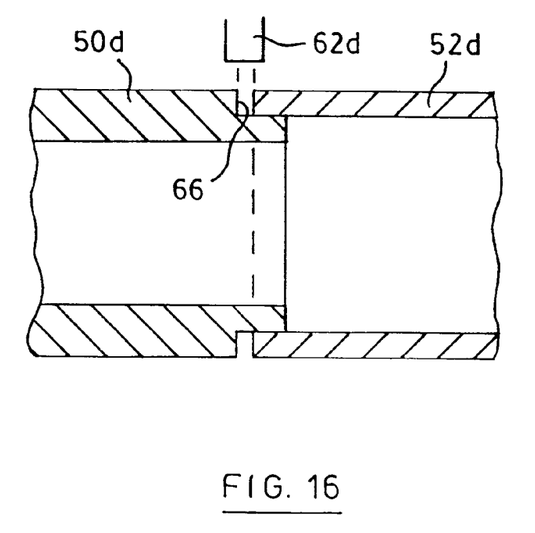
FIG. 16 is a further embodiment showing an alternative arrangement to that shown in FIG. 15.

The arrangement shown in FIGS. 15 and 16 in which suffixes "c" and "d" will be used respectively utilizes an annular recess on one of the components 50*c*,50*d* to accommodate the other tubular member 52*c*,52*d*. In the embodiment shown in FIG. 12, an annular recess 64 is formed on the radial inner surface of the wall of the tubular member 50*c* and snugly receives the tubular member 52*c*. The laser 62*c* is positioned over the overhang 58*c* to produce the welded joint.

In the embodiment shown in FIG. 16, the annular recess 66 is formed on the radially outer surface so as to be received snugly within the tubular member 52*d*. The laser beam 62*d* is positioned to impinge upon both the tubular members 50*d*,52*d* and produce a welded joint.

The operating parameters for the laser will be similar to those described above with respect to the planar embodiments.

While the embodiments of FIGS. 10–16 show the laser beam impinging on the outside of the tubes, the laser may of course be positioned internally of the tube where dimensions permit to weld from the inside and thereby maintain the quality of the exterior surface.

Similarly, the reduced thickness of one edge may be provided locally on an edge of one of the tubular members of equal wall thickness as described above with reference to FIGS. 7 and 8. Such an arrangement will be readily understood from the description of FIGS. 7 and 8 without further exemplification.

It will be seen, therefore, that the provision of an undercut on one of the adjacent edges permits the edges to overlap and avoids the necessity for close tolerances between adjacent edges to achieve a satisfactory weld.

What is claimed is:

1. A method of producing a welded joint between a pair of components each having respective edges extending along said joint, said components having dissimilar thicknesses at said respective edges, said method comprising the steps of forming an undercut on an edge of at least one of said components, placing an edge of the other of said components adjacent said undercut so that one surface of one of said components is offset in the direction of said edges from the adjacent surface of the other of said components and a portion of said one edge overpass said other component in a direction transverse to said edges to provide an overhang, applying a laser beam to said overhang to cause melting thereof and provide molten material to said joint, and subsequently cooling said edges to join said edges to one another.

2. A method according to claim 1 wherein said components are planar.

3. A method according to claim 1 wherein said components are tubular.

4. A method according to claim 1 wherein said undercut is provided by chamfering said edge.

5. A method according to claim 4 wherein a chamfer provided by said chamfering extends across said edge between opposite faces of said component.

6. A method according to claim 4 wherein said edge of said other component is chamfered.

7. A method according to claim 4 wherein said chamfer is inclined at an angle of 80° to a face of said one component.

8. A method according to claim 4 wherein a pair of oppositely directed chamfers are formed on said edge to provide said chamfer.

9. A method according to claim 1 wherein said undercut is provided by a rabbet formed at said edge.

10. A method according to claim 1 wherein said components are planar and are supported with a face of each component in lying in a common plane.

11. A method according to claim 1 wherein said beam is distributed between said portion and said other component.

12. A method according to claim 11 wherein between 40% and 60% of said beam impinges on said portion.

13. A method according to claim 12 wherein 50% of said beam impinges on said portion.

14. A method according to claim 1 wherein said beam translates relative to said components in a direction along said edges to weld progressively said components to one another.

15. A method according to claim 14 wherein said components are tubular and are rotated conjointly past said beam.

16. An article comprising a pair of components connected to one another by a welded joint formed by a method according to any preceding claim.

17. A method according to claim 1 wherein said overhang is selected to be between 1 and 2.5 times the maximum gap encountered between said components when abutting without said undercut.

18. A method of producing a welded joint between a pair of tubular members defined by respective circumferential walls of different radial thickness and each having a radial end face, said members being arranged end to end along an axis with said end faces in abutment, said method comprising the steps of forming an undercut on at least one of said end faces, placing said end faces in abutment to provide an axial overlap between said edges and at least one pair of adjacent surfaces radially offset from one another, applying a laser beam to said overlap to cause melting thereof and cooling said members to join said edges to one another.

* * * * *